United States Patent
Ge et al.

(10) Patent No.: US 8,810,518 B2
(45) Date of Patent: Aug. 19, 2014

(54) PASSWORD INPUT DEVICE

(75) Inventors: Ting Ge, Shenzhen (CN); Wen-Sen Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 239 days.

(21) Appl. No.: 13/339,197

(22) Filed: Dec. 28, 2011

(65) Prior Publication Data

US 2013/0050091 A1 Feb. 28, 2013

(30) Foreign Application Priority Data

Aug. 29, 2011 (CN) .......................... 2011 1 0250696

(51) Int. Cl.
*G06F 3/02* (2006.01)
*G06F 7/04* (2006.01)

(52) U.S. Cl.
USPC ............................................. 345/168; 726/7

(58) Field of Classification Search
CPC .............................................. G09G 3/04–3/19
USPC ............ 345/33, 34, 38, 168, 170, 172; 341/22
See application file for complete search history.

(56) References Cited

U.S. PATENT DOCUMENTS

| | | | | |
|---|---|---|---|---|
| 6,166,710 A * | 12/2000 | Havel | ............................. | 345/46 |
| 2004/0243854 A1* | 12/2004 | Lee | ............................. | 713/202 |
| 2005/0057515 A1* | 3/2005 | Bathiche | ........................ | 345/168 |
| 2008/0224638 A1* | 9/2008 | Cheng et al. | .................. | 315/349 |
| 2011/0164654 A1* | 7/2011 | Tanaka | ........................... | 374/121 |
| 2012/0319956 A1* | 12/2012 | Talach et al. | .................. | 345/168 |

* cited by examiner

*Primary Examiner* — Michael Pervan
*Assistant Examiner* — Andrew Lee
(74) *Attorney, Agent, or Firm* — Novak Druce Connolly Bove + Quigg LLP

(57) ABSTRACT

A password input device includes a display unit, an input unit and a control unit. The display unit includes a group of LCD displays for display numerals. The input unit includes a group of keys corresponding to the LCD displays. The keys are positioned on the corresponding LCD displays; the control unit creates a group of numerical key sequences, and controls the LCD displays to display the numerical key sequences through the keys.

12 Claims, 2 Drawing Sheets

PASSWORD INPUT DEVICE

BACKGROUND

1. Technical Field

The disclosure generally relates to a password input device with enhanced password input security.

2. Description of the Related Art

In order to make cash withdrawals or credit card cash advances, or transfer accounts, personal identification number (PIN) codes or used on a virtual keyboard of automatic teller machines (ATMs), point of sale (POS) terminals, or other password input devices. However, the arrangement and position of the PIN codes on the encrypting PIN pads or virtual keyboards are generally changeless and immutable. Thus, the passwords are easily deduced and obtained from passwords entry, therefore easy to be revealed.

Therefore, there is room for improvement within the art.

BRIEF DESCRIPTION OF THE DRAWINGS

Many aspects of a password input device can be better understood with reference to the following drawings. The components in the drawings are not necessarily drawn to scale, the emphasis instead being placed upon clearly illustrating the principles of the password input device. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
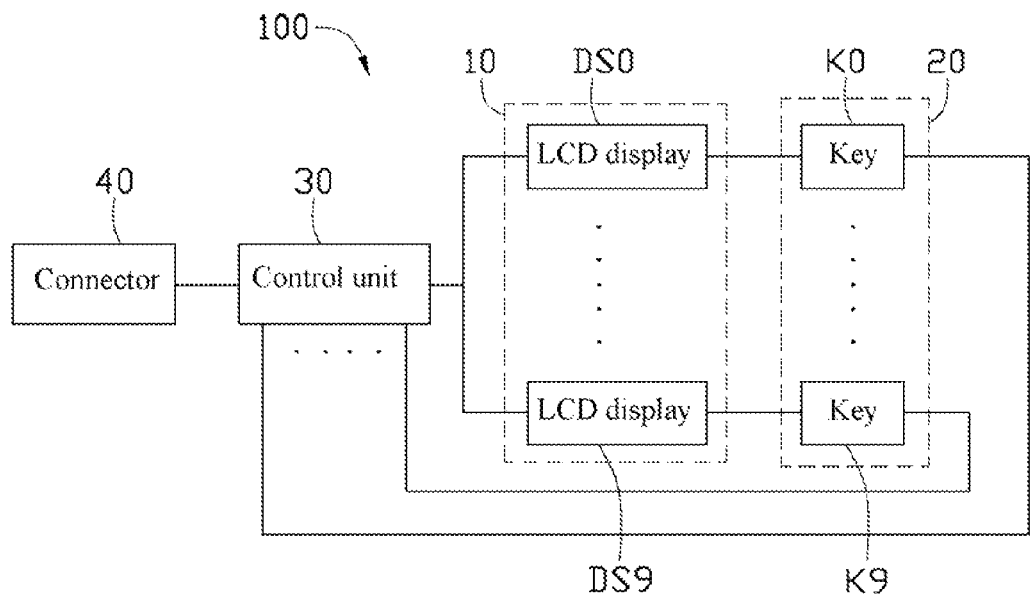
FIG. 1 is a schematic functional block diagram of a password input device, according to an exemplary embodiment of the disclosure.

FIG. 1 shows a schematic functional block diagram of a password input device 100, according to an exemplary embodiment of the disclosure. In this embodiment, the password input device 100 includes a display unit 10, an input unit 20, a control unit 30, and a connector 40.

Figure 2:
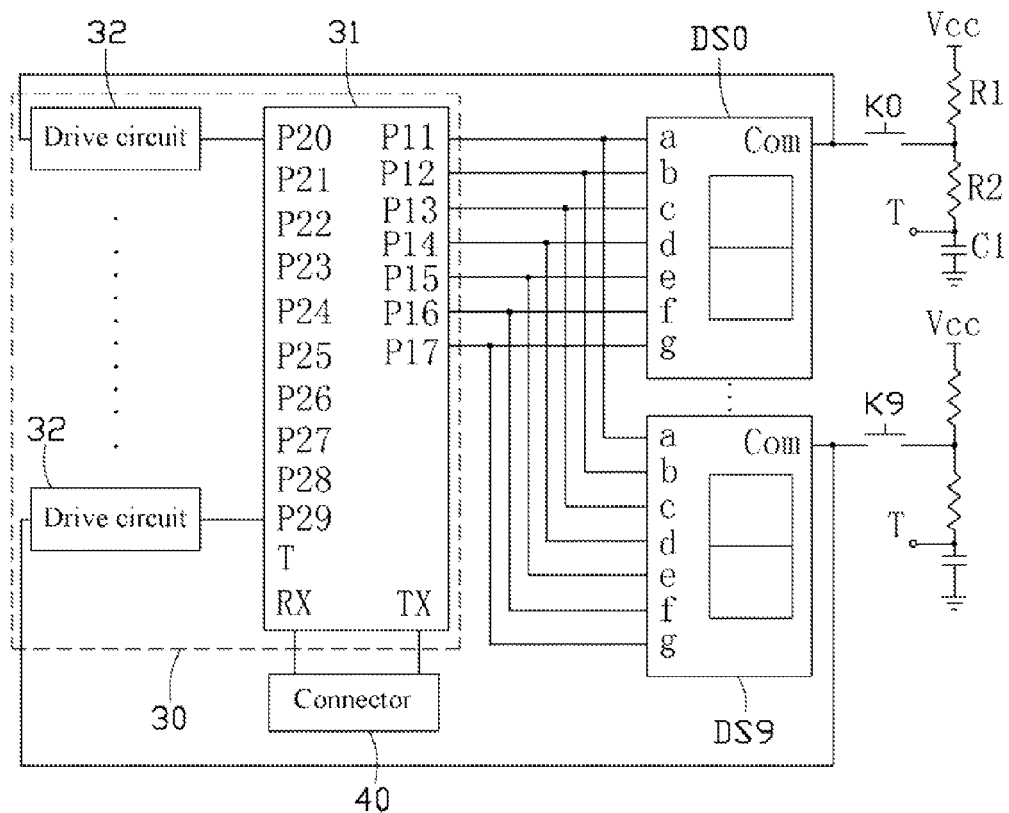
FIG. 2 is a schematic circuit diagram of the password input device shown in FIG. 1 of the disclosure.

Referring to FIG. 2, the display unit 10 includes a group of LCD displays DS0-DS9 (or other digital displays). The LCD displays DS0-DS9 are electrically connected to the control unit 30 for displaying numerals or other information. The control unit 30 controls the LCD displays DS0-DS9 to randomly display a group of virtual key sequences, where the virtual key sequences at least include digits 0-9. Each LCD display of the DS0-DS9 includes a group of input ports a, b, c, d, e, f, g, and a common port Com. The input ports a-g are electrically connected to the control unit 30 to receive command signals, such as operating voltage; the common port Com is electrically connected to the input unit 20 and to the control unit 30 to receive input signals such as switching signals from the input unit 20.

The input unit 20 at least includes a group of keys K0-K9. In one embodiment, the keys K0-K9 can be made of a transparent material, and each key of K0-K9 covers the corresponding LCD display. For example, the key K0 covers the LCD display DS0, the key K1 covers the LCD display DS1, and the key K9 covers the LCD display DS9. Thus, the numeric key sequences on the LCD displays DS0-DS9 are displayed through the transparent keys K0-K9.

When any key is operated (i.e., pressed), one end of the key is electrically connected to the common port Com of the corresponding LCD display (e.g., one end of the key K0 is electrically connected to the common port Com of the LCD display DS0, and the key K9 is electrically connected to the common port Com of the LCD display DS9), the other end of the key electrically connects to a node between a first resistor R1 and a second resistor R2. The first resistor R1 is electrically connected to a power source Vcc, and the second resistor R2 is electrically connected to ground through a capacitor C1. The first resistor R1, the second resistor R2, and the capacitor C1 are electrically connected between the power source Vcc and ground in series.

The control unit 30 includes a microcontroller 31 and a group of drive circuits 32 corresponding to the number of the LCD displays. The microcontroller 31 can be an AT89S51 monolithic chip, and includes a group of data pins P11-P17, a group of control pins P20-P29, a test pin T, and two communication ports RX and TX.

The data pins P11-P17 are electrically connected to the input ports a-g of each LCD display respectively, to output command signals to the LCD displays DS1-DS9, such as the operating voltage. For example, the data pin P11 is electrically connected to the input ports a of the LCD displays DS1-DS9, the data pin P12 is electrically connected to the input ports b of the LCD displays DS1-DS9, and the data pin P17 is electrically connected to the input ports g of the LCD displays DS1-DS9. Each of the drive circuits 32 is electrically connected between the corresponding control pin of P20-P29 and the common port Com of the corresponding LCD display of DS0-DS9. For example, one of the drive circuits 32 is electrically connected between the control pin P20 and the common port Com of the LCD display DS0, and the other drive circuit 32 is electrically connected between the control pin P25 and the common port Com of the LCD display DS5.

The drive circuits 32 can be high-power transistors and used to control and drive the LCD displays DS0-DS9. The test pin T of the microcontroller 31 is electrically connected between the second resistor R2 and the capacitor C1 of each key to receive voltage signals from the common ports Com. For example, the test pin T is electrically connected to a node between the second resistor R2 and the capacitor C1 of the key K0; the test pin T is electrically connected to a node between the second resistor R2 and the capacitor C1 of the key K9. The communication ports RX and TX are electrically connected to the connector 40 to transfer data. The connector 40 can be a RS232 interface, USB interface, or IEEE-1394 interface, which links the control unit 30 with a terminal device, such as a computer. The connector 40 includes an interface chip (e.g., a CH372 USB interface chip) to deal with data communication between the control unit 30 and the terminal device.

When the LCD displays DS0-DS9 light under the control of the microcontroller 31, the voltage of the common ports Com are preset to low (e.g., logic 0). Thus, when different keys of K0-K9, which are used to input password (e.g., 0123456), are operated, the test pin T of the microcontroller 31 receives the low voltage (e.g., logic 0) from the corresponding common ports Com, and the microcontroller 31 calculates and determines which keys are pressed. Thus, the input passwords (e.g., 0123456) are transmitted to the terminal device through the connector 40.

In use, the microcontroller 31 is programmed and randomly generates a group of virtual key sequences, and controls the LCD displays DS0-DS9 of the display unit 10 to display the group of virtual key sequences. Thus, a group of passwords can be input by operating the transparent keys K0-K9. For example, provided that a group of passwords includes numeral 569847, and the LCD displays DS0-DS9 respectively display numerals of "7", "2", "0", "4", "9", "6", "1", "8", "5", and "3" through the keys K0-K9, so the group of passwords can be input by operating the keys of K8, K5, K4, K7, K3 and K0. The test pin T of the microcontroller 31 receives the low voltage (e.g., logic 0) from the common ports Com of the corresponding LCD displays DS8, DS5, DS4, DS7, DS3 and DS0, and the microcontroller 31 determines which keys are pressed according to the low voltage. The input passwords (569847) are transmitted to the terminal device through the connector 40.

The input unit 20 further includes a group of polarizers corresponding to the LCD displays DS0-DS9, and each polarizer is positioned on a corresponding LCD display. The polarizers can pass light of a specific polarization and block waves of other polarizations, and convert a beam of light of undefined or mixed polarization to a beam with well-defined polarization. Thus, the numerals on the LCD displays DS0-DS9 can be showed in a limited angle range, which can improve security of the password entry of the password input device 100.

In the password input device 100 of the present disclosure, the microcontroller 30 can randomly generate a group of numerical key sequences, and control the display unit 10 to display the numerals through the transparent keys K0-K9. Since the numerical key sequences are random and changeable, so the password entry with high security is not easy to be revealed. In addition, the password input device 100 with the standard connector 40 can be widely applied to the banking system, public telephones, financial terminals, and other terminal devices.

In the present specification and claims the word "a" or "an" preceding an element does not exclude the presence of a plurality of such elements. Further, the word "comprising" does not exclude the presence of other elements or steps than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A password input device, comprising:
   a display unit, comprising:
      a group of LCD displays;
   an input unit, comprising:
      a group of keys corresponding to the LCD displays; and
      a control unit electrically connected to the group of LCD displays and the group of keys, wherein the keys are positioned on the corresponding LCD displays, the control unit creates a group of numerical key sequences, and controls the LCD displays to display the numerical key sequences through the keys;
      wherein each LCD display comprises a group of input ports and a common port, the input ports are electrically connected to the control unit to receive command signals, and the common port is electrically connected to the input unit and to the control unit to receive input signals, wherein the keys of the input unit are made of a transparent material, when any key is operated, one end of the key is electrically connected to the common port of the corresponding LCD display, the other end of the key electrically connects between a first resistor and a second resistor, the first resistor is electrically connected to a power source, and the second resistor is electrically connected to ground through a capacitor, and the first resistor, the second resistor, and the capacitor are electrically connected between the power source and ground in series; and
   wherein the control unit comprises a microcontroller, the microcontroller comprises a group of data pins, and a test pin, the data pins are electrically connected to the input ports of each LCD display respectively, to output command signals to the LCD displays, the test pin is electrically connected between the second resistor and the capacitor to receive voltage signals from the common ports.

2. The password input device as claimed in claim 1, wherein the control unit further comprises a group of drive circuits, the number of the drive circuits is equal to the number of the LCD displays, and the microcontroller further comprises a group of control pins, each of the drive circuits is electrically connected between the corresponding control pin and the common port of the corresponding LCD display to control and drive the LCD displays, and each drive circuit is a high-power transistor.

3. The password input device as claimed in claim 1, wherein the input unit further comprises a group of polarizers corresponding to the LCD displays, and each polarizer is positioned on a corresponding LCD display, the polarizers passes light of a polarization and blocks waves of other polarizations, and converts a beam of light of undefined or mixed polarization to a beam with well-defined polarization, so the numerals on the LCD displays are showed in a limited angle range to improve security of password entry.

4. The password input device as claimed in claim 1, further comprising a connector, wherein the microcontroller comprises two communication ports, the communication ports are electrically connected to the connector to transfer data.

5. The password input device as claimed in claim 4, wherein the connector is one of a RS232 interface, a USB interface, and an IEEE-1394 interface, the controller links the control unit with a terminal device, and the connector comprises an interface chip that interfaces data communication between the control unit and the terminal device.

6. The password input device as claimed in claim 4, wherein when the LCD displays light under the control of the microcontroller, the voltage of the common ports are preset to logic low; when the keys of the input unit are operated to input passwords, the test pin of the microcontroller receives the logic low from the corresponding common ports, and each logic low corresponds to a pressed key and the input passwords are transmitted to the terminal device through the connector.

7. A password input device, comprising:
   a display unit, comprising:
      a group of LCD displays;
   an input unit, comprising:
      a group of keys corresponding to the LCD displays; and
   a control unit, comprising:
      a microcontroller electrically connected to the group of LCD displays and the group of keys, wherein the keys are made of a transparent material, and are positioned on the corresponding LCD displays, the control unit generates a group of random numerical key sequences that are displayed on the LCD displays through the keys, and a group of passwords are calculated by user-operation of the displayed keys;

wherein each LCD display comprises a group of input ports and a common port, the input ports are electrically connected to the control unit to receive command signals, and the common port is electrically connected to the input unit and to the control unit to receive input signals, when any key is operated, one end of the key is electrically connected to the common port of the corresponding LCD display, the other end of the key electrically connects between a first resistor and a second resistor, the first resistor is electrically connected to a power source, and the second resistor is electrically connected to ground through a capacitor, and the first resistor, the second resistor, and the capacitor are electrically connected between the power source and ground in series; and wherein the microcontroller comprises a group of data pins, and a test pin, the data pins are electrically connected to the input ports of each LCD display respectively, to output command signals to the LCD displays, the test pin is electrically connected between the second resistor and the capacitor to receive voltage signals from the common ports.

8. The password input device as claimed in claim 7, wherein the control unit further comprises a group of drive circuits whose number corresponds to the LCD displays, and the microcontroller further comprises a group of control pins, each of the drive circuits is electrically connected between the corresponding control pin and the common port of the corresponding LCD display to control and drive the LCD displays, and each drive circuit is a high-power transistor.

9. The password input device as claimed in claim 7, wherein the input unit further comprises a group of polarizers corresponding to the LCD displays, and each polarizer is positioned on a corresponding LCD display, the polarizers passes light of a polarization and blocks waves of other polarizations, and converts a beam of light of undefined or mixed polarization to a beam with well-defined polarization, so the numerals on the LCD displays are showed in a limited angle range to improve security of the password entry.

10. The password input device as claimed in claim 7, further comprising a connector, wherein the microcontroller comprises two communication ports, the communication ports are electrically connected to the connector to transfer data between the control unit and the connector.

11. The password input device as claimed in claim 10, wherein the connector is a RS232 interface, a USB interface, or an IEEE-1394 interface, the controller links the control unit with a terminal device, and the connector comprises an interface chip that interfaces data communication between the control unit and the terminal device.

12. The password input device as claimed in claim 10, wherein the microcontroller controls the LCD displays to light, the voltage of the common ports are preset to logic low; when the keys of the input unit are operated to carry out password entry, the test pin of the microcontroller receives the logic low from the corresponding common ports, and the microcontroller determines the operated keys according to the logic low from the common ports, and the input passwords are transmitted to the terminal device through the connector.

* * * * *